Aug. 22, 1933.            H. F. SMITH            1,923,331
         CALORIMETER AND FLUID REGULATING DEVICE
              Filed Feb. 13, 1925      5 Sheets-Sheet 3

Witness
John W. Wright

Inventor
Harry F. Smith
By
Marechal and Fehr
Attorneys

Aug. 22, 1933.　　　　　H. F. SMITH　　　　　1,923,331
CALORIMETER AND FLUID REGULATING DEVICE
Filed Feb. 13, 1925　　　　5 Sheets-Sheet 4

Witness
John W. Wright

Inventor
Harry F. Smith
By
Marechal and Fehr
Attorneys

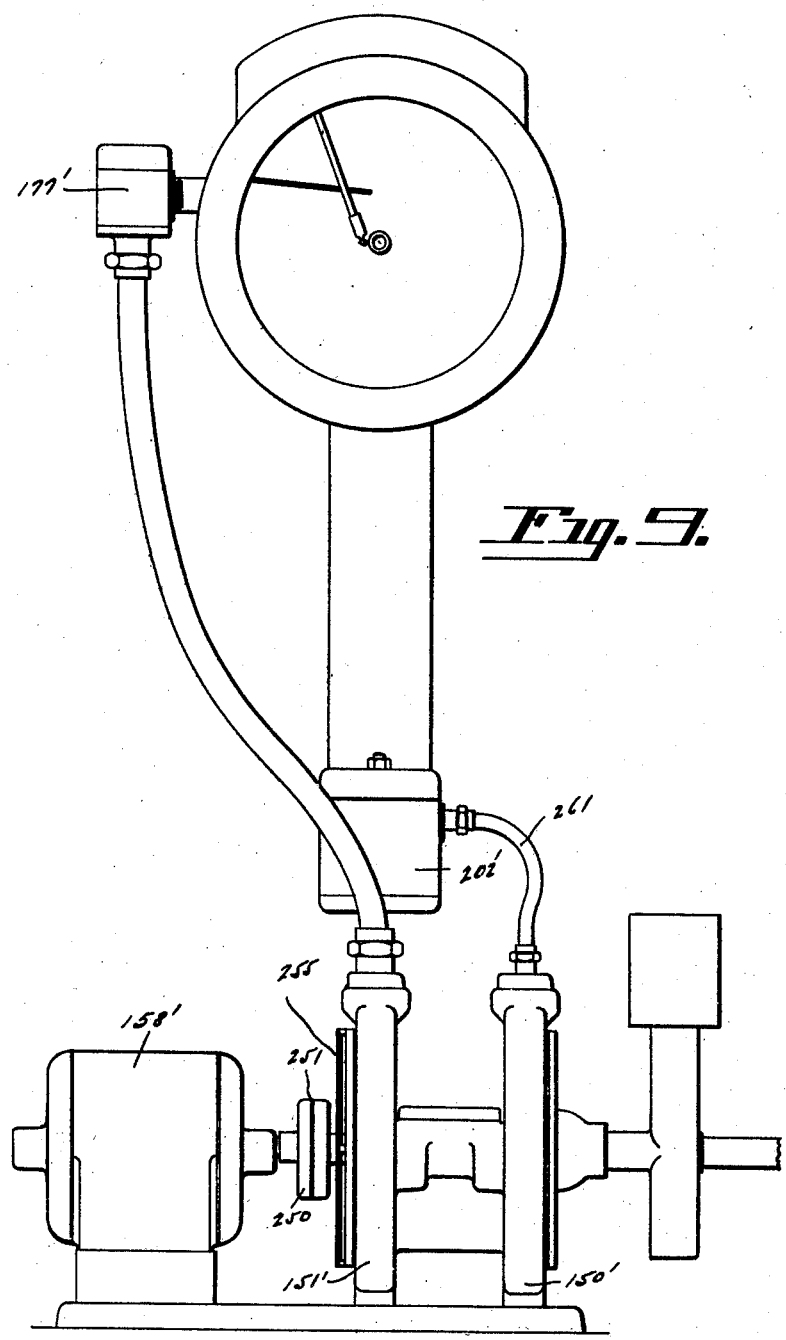

Patented Aug. 22, 1933

1,923,331

UNITED STATES PATENT OFFICE 1,923,331

CALORIMETER AND FLUID REGULATING DEVICE

Harry F. Smith, Dayton, Ohio, assignor to The Gas Research Company, Dayton, Ohio, a Corporation of Ohio Application February 13, 1925. Serial No. 9,022

15 Claims. (Cl. 137—164)

This invention relates to calorimeters, and to devices for regulating the supply of fluid thereto, and more particularly to apparatus of this character adapted for indicating or recording the heat value of combustible gases.

One of the principal objects of the invention is to provide an improved form of calorimeter which is simple and cheap in construction, easy of maintenance, accurate in its operation, and constructed to indicate or record directly the heat value of gases or other fuel, automatically corrected to standard conditions.

Another object of the invention is to provide a regulating device which is adapted to accurately regulate the flow of a fluid through an orifice, irrespective of specific gravity variations of the fluid, or to regulate the flow of a plurality of fluids, to insure constant proportional delivery of such fluids.

Other objects and advantages of the invention will be apparent from the description thereof set out below when taken in connection with the accompanying drawings.

In the drawings, in which like characters of reference designate like parts throughout the several views thereof.

Fig. 9 is a slightly modified form of apparatus particularly designed for high B.t.u. gas.

In the patent to Harry F. Smith No. 1,134,768, dated April 6, 1915, is shown a method of determining the heat value of a combustible gas, and apparatus for carrying that method into effect.

In the copending application of Harry F. Smith Serial No. 581,175, filed August 11, 1922, also is shown a form of apparatus for carrying that method into effect.

The apparatus illustrated herein as showing an embodiment of this invention is also intended to carry into effect the method set out in this referred to patent.

That method consists broadly, in introducing a combustible gas, or other carbonaceous fuel, and atmospheric air, or its equivalent, in proper proportions, into the combustion chamber of the calorimeter proper, burning this gas in such wise that the resulting heat of combustion effects a temperature responsive device to indicate directly the heat value of the combustible gas, the instrument being so calibrated that the number of heat units contained in a given quantity of the combustible gas is directly indicated or recorded.

Figure 1:
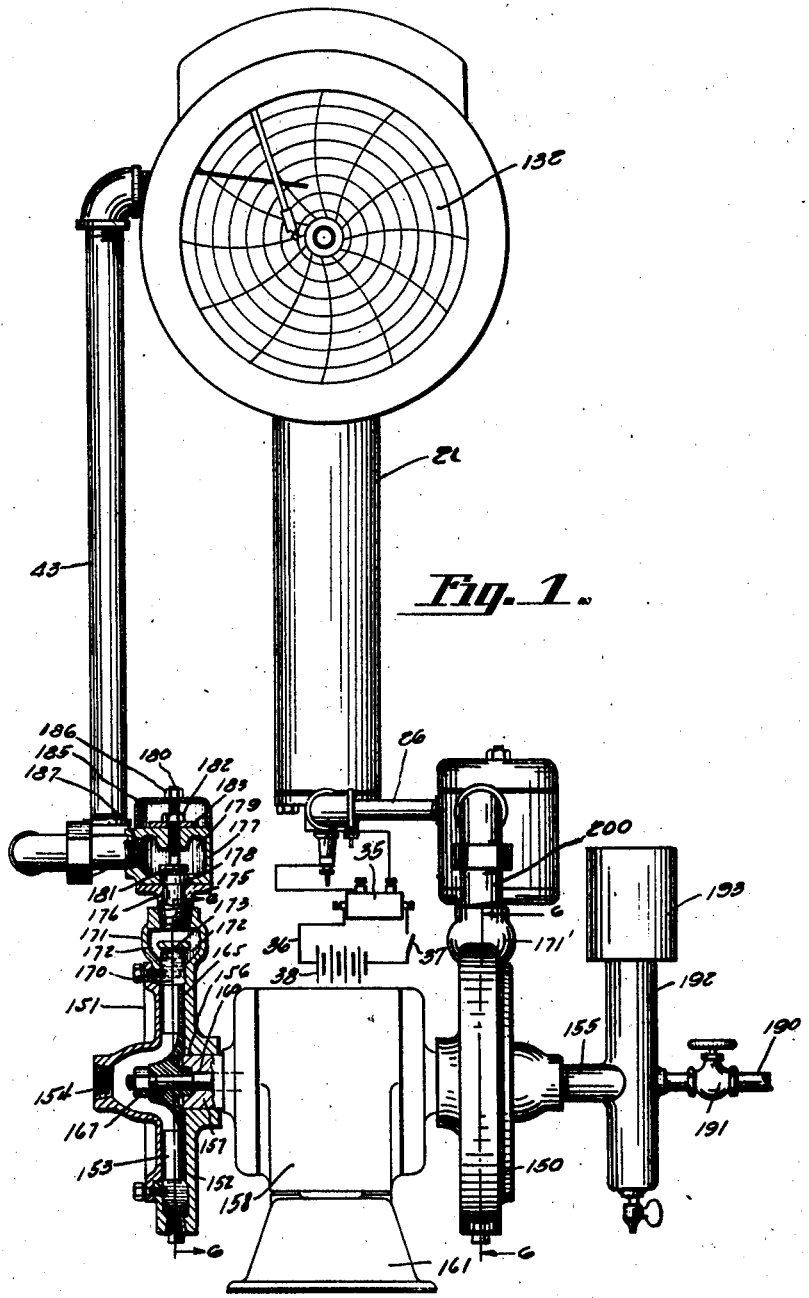
Fig. 1 is a view of a form of apparatus adapted for continuously recording the heat value of a fuel, with certain parts thereof shown in section to more clearly disclose the construction.

The calorimeter proper, which forms part of the subject matter of this invention is quite similar in its construction to the calorimeter thus shown and described in the above referred to copending application. This apparatus, which is indicated generally by the numeral 20, comprises a cylindrical shell 21, in the lower end of which is located a ported plate 22, which is secured to the shell in any desired manner, the method of attachment being a matter of indifference so long as a tight joint is secured. Preferably this plate is pressed into place with a gas tight fit. This plate 22 has a substantially centrally arranged opening 23 therein, within which is mounted a fitting 24. This fitting 24 is provided with a curved passage 25, one end of which opens through the side of the fitting and is adapted to receive the gas supplying pipe 26 which leads from any suitable source of supply of gas in proper quantities, this source of supply being described hereinafter. The other end of the passage 25 is substantially coaxial with the fitting itself, and has positioned therein a nozzle 27, which is arranged substantially coaxial with the shell 21, this nozzle having a centrally arranged passage 28 therein through which gas passes from the pipe 26 to the interior of the calorimeter shell. Mounted upon the nozzle 27 is an extension pipe 29, which extends upwardly into the calorimeter, the delivered gas thus passing from the nozzle into the pipe 29 and thence into the interior of the calorimeter shell. The plate 22 has a second passage 30 therein, within which is positioned a spark plug 31. This spark plug carries a wire or point 32, one end of which is attached to a suitable source of electrical potential by means of the conductor 33, the other end extending upwardly into the shell of the calorimeter and terminating adjacent the upper end of the pipe 29. This pipe constitutes the other sparking element or point of the spark plug, being attached to the other pole of the source of electrical potential by means of a conductor 34, which is grounded to the fitting 24. As shown in Fig. 1 the conductors 33 and 34 are connected to opposite poles of the high tension coil of a spark coil 35, the low tension coil of which is connected to any suitable source of electrical energy, by means of conductors 36, having therein a switch 37, the construction being such that by closing the switch the spark coil may be caused to function to cause the passage of sparks between the wire 32 and the free end of the pipe 29 to thus ignite the combustible mixture within the shell of the calorimeter. As shown the source of electrical energy is a storage battery 38, but any other suitable source of electrical energy may be used.

The upper end of the cylindrical shell 21 has therearound a cylindrical sleeve 40, the open upper end of which is closed by means of a plate 41, which is connected to the cylindrical sleeve 40 in any suitable manner, as for instance by means of bolts. The cylindrical sleeve 40 is preferably connected to the shell 21 in the manner shown, but any other suitable type of gas tight connection may be had. Threadedly received within a suitable opening in the sleeve 40 is a pipe 43, the other end of which is connected to a suitable source of air. This construction is such that, during operation, air, in predetermined quantity, is introduced into the interior of the sleeve 40, and passes downwardly therethrough into the interior of the cylindrical shell 21 for admixture with the gas to form a combustible mixture.

Positioned within the shell 21, and attached to the depending flange 45, surrounding the opening 46, in the cover plate 41, is a cylindrical tube 50, which is arranged substantially coaxial with the cylindrical member 21, and extends downwardly thereinto with its lower end terminating a short distance from the upper end of the pipe 29. Surrounding the cylindrical tube 50, and arranged in spaced relation between this tube and the cylindrical shell 21 are a plurality of corresponding tubular members 51. These tubular members 51 are held in properly spaced position, the lower end of the tubular members being positioned within grooves 52 in the upper face of the plug 53, which is supported upon the closure plate 22, and the upper ends being correspondingly positioned within grooves 54, within a corresponding member 55, which is held in fixed position in the upper end of the tube by means of the set screw 56, which is threadedly mounted within a suitable threaded socket in the depending flange 45 of the plate 41. This set screw also passes through a hole in the tube 50 and serves to lock that tube firmly to the flange 45. By means of this construction a free downward flow of air from the interior of the sleeve 40 into the interior of cylindrical member 21 is permitted, the air, in its downward course passing over and between the cylindrical tubes 51 and the member 50 so that it is preheated as it flows into the member 21, for admixture with the gas entering through the pipe 26, to form a combustible mixture.

Figure 3:
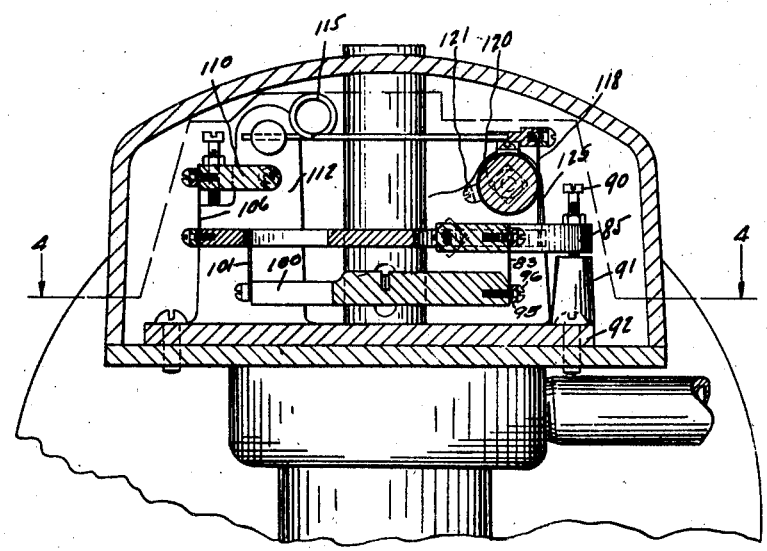
Fig. 3 is a vertical sectional view through the upper part of the calorimeter proper, the section being along the line 3—3 of Fig. 4.

It will be noted that the construction herein illustrated and described differs from the construction shown in Fig. 3, for example, of the referred to copending application. In that copending application the tubular members, corresponding to the members 51, are so arranged that the inflowing air follows a tortuous path. In the construction shown and described herein the air flows continuously, although it is split up into streams and resistance to flow is thus minimized so that the back pressure which must be overcome by the fluid regulating device supplying the air and gas to the calorimeter in definite proportions is minimized. As the air passes downwardly from the interior of the sleeve 40 into the member 21, it absorbs the heat which tends to escape into the atmosphere by transfer from one tubular sleeve to another with final radiation into the atmosphere, so that a true indication is possible of the actual heat liberated within the calorimeter during the burning of the gas.

Supported within the opening 46 and the flange 45 is a depending sleeve or tubular member 60, which extends downwardly within the tube 50, and terminates at its lower end, adjacent the lower end of the tube 50, in a flaring end 61, which is of such size that it substantially fills the tube 50, this construction being such that the products of combustion within the cylindrical member 21 pass upwardly through this tubular member 60 and out to the atmosphere through a chimney or vent pipe 62, which surrounds the opening 46.

Located within this tubular member 60 is a heat responsive element 65, which consists of a strip or ribbon of some heat resisting material, such as a nickel alloy steel or the like. This ribbon is folded upon itself about a transverse pin or roller 66 which extends entirely across the cylindrical member 21, and has its ends positioned within suitable openings therein, nuts 67, being provided to hold this pin securely in place. Each of the members 50 and 51 is provided with suitable openings to receive this pin 66, each of these openings being of greater diameter than the pin itself so that any expansion or contraction of the various members during operation of the device will have no effect upon the relative positioning of the pin 66; the shell 21 being maintained at uniform temperature during operation. Therefore expansion or contraction of any of the members 50, 51 will not affect operation of the device. As shown, particularly in Fig. 2 the upper ends of the members 50—51 are spaced from the member 55 to allow for such contraction and expansion. The free ends of the heat responsive strip 65 are riveted to the opposite faces of two steel bars 70, between which there is also riveted a single steel strip 71, the upper end of which is firmly riveted between two cross bars 72, which extend at each end through an opening in the chimney or vent pipe 62. Preferably the construction shown is used, in which the blocks 70 consist of two blocks of equal thickness which are riveted together with the ends of the strip 65 on opposite faces thereof, and the strip 71 between adjacent faces. And preferably two bars 72 are also used, which are riveted together with the upper end of the strip 71 between them.

The opposite ends of the bars 72, which function as a signle bar because of being riveted together, extend through the vent pipe and are mounted within suitable slots in the member 80. This member is plate like in form, the center thereof being removed to provide a passage 81, through which the chimney 62 extends. One end of this member is connected by means of two flexible strips or straps 83 to the somewhat U shaped member 85, which is pivotally supported at its open end upon the pivot points 86, which are in turn rigidly mounted in the standards 87. The other or closed end of the member 85 is provided with an adjusting screw 90, which contacts with the upstanding standard 91, carried upon the base member 92, which member also carries the upstanding standards 87. As a function resulting from this construction the member 85 may be swung, as desired, about the pivots 86, and by suitable manipulation of the adjusting screw 90 this member 85 may be caused to assume any desired position, and thus the end of the member 80 which is suspended from the member 85 by means of the straps 83, may also be caused to assume any desired position. The straps 83 may be secured to the members 80 and 85 in any desired manner, but they are preferably secured by means of clamping members 95, through which extend small stud bolts 96, which extend through cooperating holes in the clamping members, the flexible straps and into threaded sockets in the members 80 and 85. By using the clamping members 95 any flexing of these straps will be directly across the strap to thus give a definite effective length to each strap after it is secured in position.

The other end of the member 80 is provided with an extension 100, the free end of which has attached thereto one end of a flexible strap 101, the other end of this strap being connected to the forked lever 105, intermediate the ends of this lever. The two forked ends of this lever are connected by means of suitable flexible straps 106, to the yoke member 110, the arms of which are supported upon suitable pivots 111, which are mounted in the standards 112, carried by the base member 92. The pivots 111 and also the pivots 86 are preferably made of hardened steel, and since there is practically no movement of these various pivoted members about their supports except during adjustment of the yokes, wear is negligible, and pivots of this character function very satisfactorily, while being cheaply and easily manufactured.

All of the steel straps for connecting the various lever members of the yoke together are preferably attached by means of clamping members and bolts, in the manner described above.

Suitably attached at one end to the upper end of each of the standards 112 are springs 115. The other end of each of these springs has attached thereto one end of a flexible strap 118, the lower end of which is wound partly around the cylindrical roller or drum 120, and is firmly attached thereto by means of a suitable set screw or bolt 121.

These springs are so constructed and mounted that they are normally under tension, tending to rotate the roller 120 in such wise as to lift up on the end of the member 105, which is connected to this roller by means of a flexible strap 125, one end of which is suitably attached to the roller 120, and the other end to the member 105. The springs 115 thus tend to rotate the roller, and this rotation is proportional to the elongation or contraction of the thermostatic strip 65, under the influence of the heat of the combustion within the calorimeter.

Figure 5:
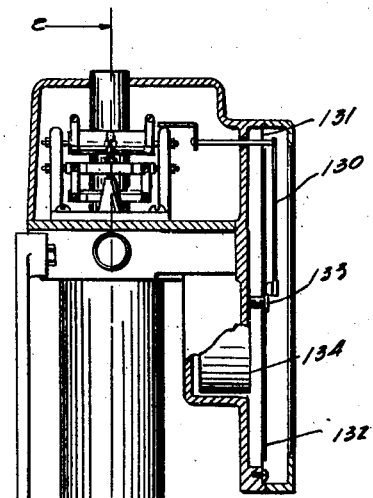
Fig. 5 is a side elevation of the calorimeter proper, the upper part of the calorimeter being shown in section, the section being along the line 5—5 of Fig. 2.

The roller 120 has rigidly secured thereto, as shown particularly in Fig. 5, an indicating needle or pen 130, which cooperates with the dial 131, upon which may be positioned a suitable indicating card, such for example as the card shown in Fig. 1 by the numeral 132. This dial 131 is mounted upon a shaft 133 which is driven by suitable clock mechanism designated generally by the numeral 134, so that rotation at a predetermined rate is secured. This particular part of the apparatus is used, of course, only where the calorimeter is constructed for giving a continuous record, the pen tracing a line over the card 132 as it rotates. If it is desired to have an instrument for giving only indications of the character of gas being burned therein, but the making of a continuous record is not desired, then this particular part of the mechanism could be dispensed with, an indicating needle provided with an ordinary point and a properly marked cooperating scale being substituted in place of the pen, clock and dial mechanism described above. This particular part of the mechanism is conventional in construction, and the clock mechanism and the like is not shown in any greater detail on that account.

As stated above, the heat value of the combustible gas, or other fuel, is determined by burning the gas with air, in definite predetermined proportions, within the calorimeter proper. As clearly set forth in the above referred to patent of Harry F. Smith, No. 1,134,768, the accuracy of the indications is directly dependent upon maintaining the proportions of air and gas constant. Theoretically any type of pump which is constructed to accurately supply air and gas, or such other fluids as may be used, will function satisfactorily in delivering the air and combustible fluid to the combustion chamber in the proper proportions. But no pump has been found available on the market which will, in actual practice, function satisfactorily. As stated in the copending application of Harry F. Smith, above referred to, it is because of this inability to secure suitable pumps that applicant devised the type of pump which is shown in that copending application.

In this connection, it should be kept in mind that in a calorimeter of the type described herein, the proportion of gas to air supplied to the combustion chamber is quite small. Where a low heat value gas, such as producer gas, which will ordinarily have a heat value ranging from 120 to 200 B. t. u. per cubic foot, is the type of fuel whose characteristics are to be determined by the use of this calorimeter, the air and gas are preferably supplied to the combustion chamber in the proportion of substantially 29 parts of air to 1 of gas. Because of the comparatively large quantity of air to gas, in such cases, slight variations in the actual quantity of air supplied are not of material importance since it would take a considerable variation to produce any appreciable error in the indications or recording of the calorimeter. But material variations in the relative quantity of gas do produce very appreciable errors. Of course, it is desirable that there be no material variation in the proportion of air supply, but slight variations in the supplying of air, do not affect the accuracy of functioning of the apparatus as do corresponding variations in the proportion of gas supplied. And where the calorimeter is used to determine the characteristics of a high heat value gas, such as natural gas or city gas, it is evident that the air will be introduced in a still greater relative proportion than that mentioned above, and therefore any variations in the relative quantity of gas introduced will cause even more marked inaccuracies.

Figure 6:
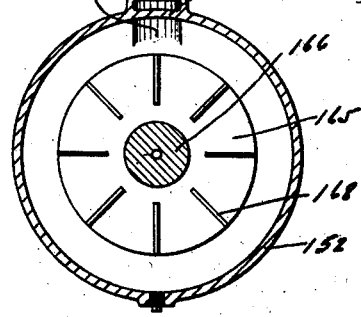
Fig. 6 is a vertical sectional view through one of the regulating devices, the section being along the line 6—6 of Fig. 1.

The apparatus shown in the drawings, particularly Figs. 1 and 6, for supplying the air and combustible fluid to the combustion chamber, in the desired manner, consists, generally, of two centrifugal blowers in which the fan, or rotor element, is provided with radial blades, and with a casing or housing which is circular in longitudinal cross-section and concentric with the fan, both fans being driven at the same speed, and each housing having a fixed outlet opening which is small compared with the capacity of the fan, these openings being properly proportioned with respect to each other, in view of the character of the combustible fuel, whose characteristics are to be determined. In such a form of blower the pressure delivered at the outlet orifice will be a direct function of the specific gravity of the fluid being pumped. And the velocity of flow of the fluid through the outlet orifice will, for any given pressure, be an inverse function of the specific gravity. As a consequence, the quantity of the fluid delivered through the orifice will be irrespective of variations in specific gravity due to changes in the inherent composition of the fluid; and where two blowers are used, with outlet orifices of the same size, and fluids of different specific gravity are being transmitted, the quantity of fluid delivered through each orifice will be the same. Also if delivered orifices of different sizes are used the two fluids will be delivered in a definite proportion. So by properly proportioning the orifice controlling the gas and the orifice controlling the air, relative to each other, in a calorimeter of the character described, a definite proportioning of air and gas will be secured, so long as the two blowers are operated at the same speed.

As shown particularly in Fig. 1 two centrifugal blowers are used, one of which is designated generally by the numeral 150, and is adapted to supply gas or other combustible fluid to the calorimeter and the other of which is designated generally by the numeral 151 and is adapted to supply the air to the combustion chamber of the calorimeter. Each of these blowers comprises a casing or housing 152 which is provided with a cover plate 153, each of which cover plates has a centrally arranged inlet opening 154, the inlet opening of the pump 150 being adapted for receiving a gas, or other fluid, supplying pipe 155, while the inlet opening of the blower 151 is open to the atmosphere, to permit the passage of air into the blower during operation thereof. Each housing 152 is provided with a hub 156 having a centrally arranged passage therein adapted to receive an extension 157, which is carried by the frame of the motor 158, and serves the dual function of supporting the housing 152 and as a bearing for the end of the motor shaft 160, this shaft being so constructed that it supports the rotor element of the motor, and extends at each end through the respective bearings 157 into the space within the corresponding blower housing. The motor is supported on any suitable base, which is indicated conventionally at 161.

Mounted upon each end of the motor shaft is a fan element 165, which consists essentially of a disk having a central hub 166, which receives the cooperating end of the shaft 160, and is held thereon by means of a nut 167, in the manner shown. As shown particularly in Fig. 6, the disk is provided with radially arranged blades 168, and the pump casing is provided with a peripheral outlet 170, which is also substantially radial. At the place where this outlet is located the housing is provided with an enlargement 171, which is connected to the outlet 170 by means of two diagonally arranged passages 172, the casing 152 being continued across the outlet 170, above the place of connection of each of these diagonal passages with the outlet, as shown in Figs. 1 and 6, to thus provide a baffle 173 which, with the space within the enlargement 171, tends to damp out surging or fluctuations in the delivered gas or air, so that the pressure within the enlargement 171 is suitably free from impulses.

The effective size of the outlet opening or orifice through which pressure fluid is delivered from the blower housing is not determined by the effective area of the outlet opening 170. But there is mounted upon the enlargement 171, a member 175, which has a passage 176 therein the inner end of which is connected to the interior of the enlargement. Mounted upon this member 175 is a casing 177, which has a passage 178 therein registering with the passage 176 and thus connecting the space 179 within the casing 177 to the space within the enlargement 171. Threadedly mounted within the casing 177 is a valve stem 180, which has a valve 181 positioned upon the lower end thereof, and constructed to cooperate with the opening 178. By proper manipulation of the stem 180 the valve 181 may be moved to increase or decrease the effective opening through the passage 178, to thus permit of securing and maintaining any pre-determined, and desired, effective outlet opening or orifice for the blower. As shown, the stem 180 is provided with a lock nut 182, by means of which the valve 181 may be locked in any desired adjustment. In order to facilitate adjustment an indicating dial 183, may be provided, which carries suitable indications for facilitating adjustment of the valve 181 to any desired position. In order to prevent inadvertent or accidental change in the adjustment of the valve, after its proper positioning has been determined, a cover 185 is provided, through which the upper end of the valve stem passes, a nut 186 being mounted upon the end of the valve stem, above the cover, which nut by proper manipulation will hold the cover tight in place so that variation in the positioning of the valve can not take place without first removing the cover.

The casing 177 is provided with an outlet opening 187, within which one end of the pipe 43 is inserted, through which air is supplied to the interior of the calorimeter.

Figure 2:
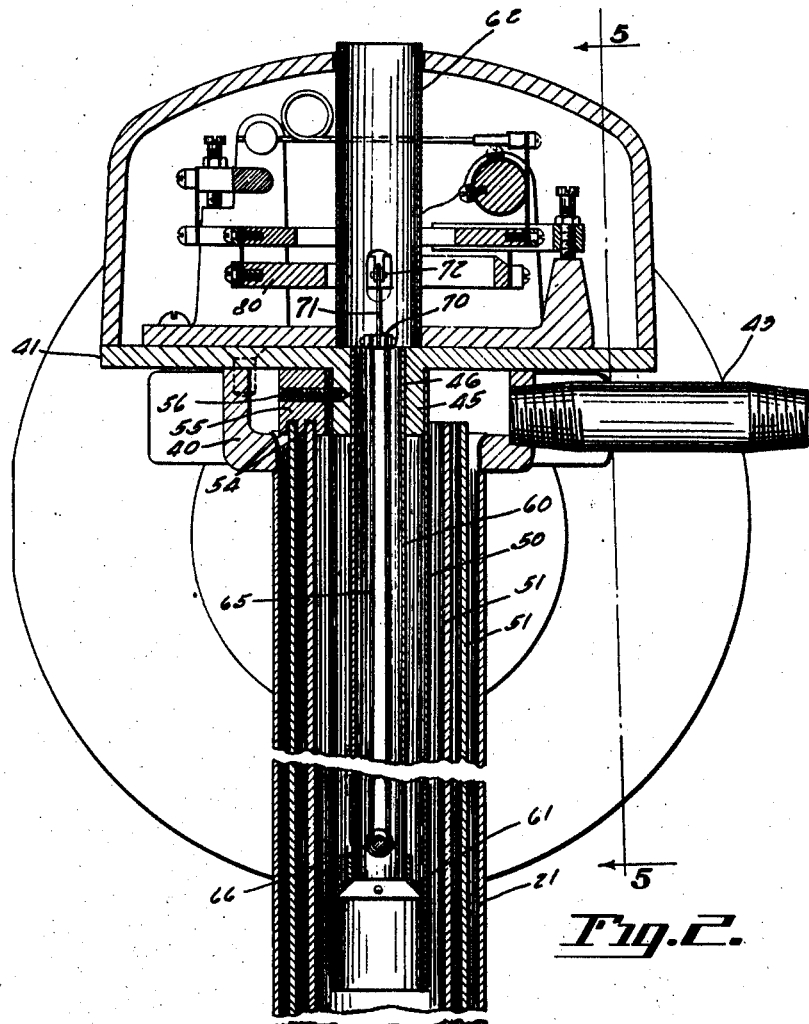
Fig. 2 is a vertical sectional view through the calorimeter proper, the section being along the line 2—2 or Fig. 5.
Figure 4:
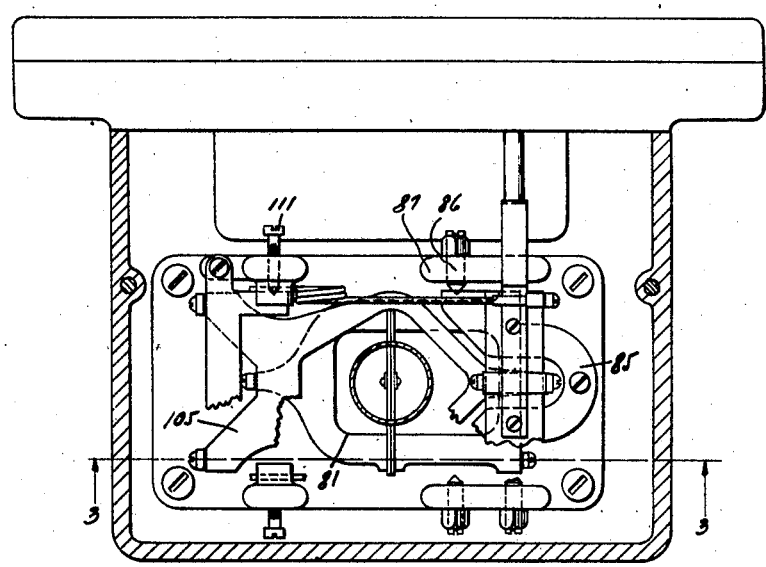
Fig. 4 is a horizontal sectional view, through the upper part of the calorimeter, the section being along the line 4—4 of Fig. 3.

The description above is based on the pump 151, which, as shown in the drawings, is adapted to supply air to the combustion chamber of the calorimeter. Of course pump 150, which is adapted to supply gas to the combustion chamber of the calorimeter, would not be connected in any way to the pipe 43, but would be connected rather to the pipe 26, through which gas is supplied to the combustion chamber, as shown in Fig. 2. Otherwise, the construction of the centrifugal pump 150 is the same as the construction of the centrifugal pump 151, it being obvious, upon the inspection of Fig. 1 for example, that as shown the parts of the two pumps are reversely arranged, since the two pumps are constructed for attachment to the opposite ends of the same shaft.

The gas, or other fuel, is supplied, from any suitable source of supply, through a pipe 190, within which is positioned any suitable type of control valve 191. This pipe 190 opens into an elongated chamber or receiver 192, to which is also connected the pipe 155, which, as stated above, is connected to the inlet opening of the pump 150. Gas is supplied under pressure through the pipe 190, to the chamber 192, and is withdrawn from that chamber, through the pipe 155, under the action of the pump 150. As is clearly shown in Fig. 1, the upper end of the chamber 192 is connected to an enlargement 193, which is open to the atmosphere. The valve 191 is positioned so that more gas will be introduced into the chamber 192 than is withdrawn therefrom by the pump 150. Excess gas passes upwardly and escapes through the open end of the enlargement 193. This excess gas is ignited and this burning gas serves to indicate any interruption in the gas supply, or a change in its physical condition, such as a change in its elements. Because of this arrangement, the gas at the pump inlet is at all times at substantially atmospheric pressure, irrespective of the pressure within the pipe 190; and so both the gas and air are under the same pressure at the pump inlets.

It is to be understood that producer gas, when generated, especially when made from bituminous coal, contains considerable quantities of impurities which would tend to gum up the blower, to collect in the orifices and thus interfere with the accuracy of proportioning of the air and gas, etc. Producer gas is consequently quite generally subjected to some type of cleaning or purification, to adequately remove these impurities; but at times the purifying apparatus may not function satisfactorily. Excess impurities would then be present in the gas which would interfere with the effective functioning of the calorimeter and the proportioning device therefor. Where the gas is burned, as described above, the presence of excess impurities will be evident, for the color and character of the flame will vary with the nature and proportion of such impurities. Furthermore, this particular part of the apparatus will at all times show whether a sufficient quantity of gas is being supplied through the pipe 190, for only excess gas will burn at the enlargement 193.

Even when subjected to such cleaning that it is commercially usable producer gas still contains appreciable quantities of impurities such as tar and the like. These impurities have a tendency to precipitate as the gas passes through the outlet orifice. And even though the amount of such impurities may be small, the depositing of any appreciable amount of tar or other impurities in an outlet orifice, such as described above in connection with the description of the pump 151, would cause very marked inaccuracy of the apparatus, because the variation in the effective opening through the orifice though slight, would constitute a very appreciable change in the total effective opening.

In order to minimize the effect of such depositing of impurities, the pump 150, which supplies the gas, is provided with a different type of outlet orifice from that shown in connection with pump 151 and described above.

In connection with the pump 150, the outlet opening from the enlargement 171' is connected by means of the pipe 200 to a vertically arranged passage 201, which constitutes one of a series of similar passages which are vertically arranged, in definitely spaced relation, within the wall of the cylindrical member 202. This member 202 is also provided with a centrally arranged chamber 203, the primary purpose of which is to lighten the weight of this member by reducing the amount of metal therein. The member 202 is provided with a top or cap 205, which is held in place by means of a bolt 206, passing therethrough and threadedly mounted within a spider 207 located within the chamber 203 and formed integral with the wall of the member 202. This top 205 is provided with a plurality of pockets 208, suitably spaced from each other, the spacing of these pockets being in accordance with the spacing of the passages 201, within 202. Furthermore, each of these pockets has substantially the same angular width as each of the passages 201, and the construction is such that, when the top 205 is in operative position, each of the pockets 208 will overlap two adjacent passages 201. Between the top 205 and the member 202, when these two parts are assembled in operative position, is a disk or plate 210, which has therein a series of holes or passages 211, these holes being so spaced that any two of them will lie within the angular width of any one of the passages 201 or any one of the pockets 208, and so that any two of them may be positioned to lie upon opposite sides of any one of the partitions separating the passages 201 from each other, or the partitions separating the pockets 208 from each other.

Figure 7:
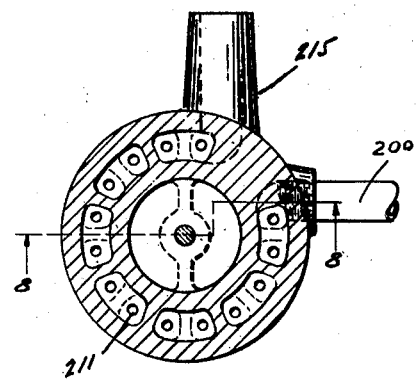
Fig. 7 is a horizontal sectional view through a portion of the apparatus, the section being along the line 7—7 of Fig. 8, looking in the direction of the arrows.
Figure 8:
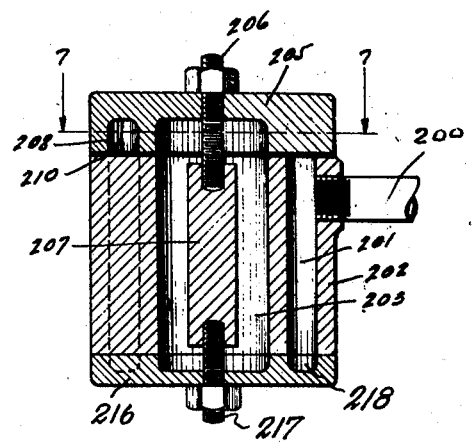
Fig. 8 is a vertical sectional view of the same portion of the apparatus shown in Fig. 7, the section being along the line 8—8 of Fig. 7.

Leading off from that one of the passages 201, which lies immediately adjacent the passage receiving the pipe 200, is an outlet 215, to which is connected the pipe 26, through which gas is supplied to the combustion chamber of the calorimeter. As shown particularly in Fig. 7, the member 202, the top 205 and the ported plate 210 are so arranged relative to each other that gas entering through the pipe 200 into the passage 201 passes upwardly through one of the orifices 211 into one of the pockets 208 cooperating with that orifice 211 thence through that pocket and out through the adjacent orifice into the next succeeding passage 201. That is, the passages 201 and the pockets 208 are relatively so arranged, and the plate 210 is relatively so arranged between the member 202 and the top 205, that the gas which is introduced from the pipe 200 passes in a tortuous course from the first passage 201, through the various pockets and other passages 201 into the final passage 201, whence it passes through outlet 215 and pipe 26 into the interior of the combustion chamber. As shown clearly in Fig. 8, this tortuous passage is completed by a base plate 216 bolted to the spider 207 by bolt 217, this base plate having a plurality of spaced pockets 218 therein, each of which overlaps two adjacent passages 201, with these pockets 218 positioned in staggered relation with respect to the pockets 208 in the cap 205.

Each of the orifices 211 is of considerably greater effective area or opening than would be the case if only a single orifice were used. As the gas passes in its tortuous course through the various passages, orifices and pockets its freedom of flow is impeded so that the amount of gas actually delivered through the outlet orifice 215 for a given impressed pressure from the pump 150, that is at the inlet to the passage 201, is very materially less than would pass through a single orifice having the effective opening of each of the holes 211, for the same drop in pressure. That is to say, by multiplying the number of orifices, and causing the gas to pass in a tortuous passage, each change in direction of its flow cutting down its rate of flow, and also by staging down the drop in pressure from the inlet to the outlet orifice, the practical result is as if a smaller orifice were used with the same differential pressure across it, or as if an orifice of the given size were used with a less differential pressure across it. Furthermore, and what is a very important thing if a proportioning device of this kind is to function accurately, the resistance against which the pump delivers the gas is materially decreased. And as described above, the combustion chamber of the calorimeter is so constructed that resistance to flow of the air through the various sleeves 51, is minimized, the air being passed in one direction and not caused to follow a tortuous path as has been the usual practice in calorimeters of this character as heretofore designed by applicant.

In Fig. 9 is shown a slightly modified form of apparatus, particularly designed for high B.t.u. gas. As stated above, where a high B.t.u. fuel is used the relative proportion of air to fuel is greatly increased, and consequently any variation in the quantity of fuel needed with result in very substantial variations in reading of the calorimeter. This is particularly true with a fuel such as natural gas, which has an average heat value of approximately 1000 to 1100 B.t.u. per cubic foot. With fuel of this character, it is found that slight inaccuracies sometimes occur with the form of apparatus described above due to the transfer of heat, during operation, from the motor to the pump casings, with resultant heating of the gases passing through the pumps, to thereby interfere with the proper proportioning of the two gases.

In the modification of the device shown in Fig. 9 the possibility of such slight inaccuracies is avoided. In this modification the two pumps are both placed upon the same side of the motor, with the pump 151', for supplying the air being placed between the motor and the pump 150' for supplying the gas. The rotor elements of these two pumps are both mounted upon the same shaft, which is in turn connected by means of a suitable flexible coupling 250 to the shaft of the motor 158'. This coupling 250 may be of any suitable character, but it is preferably one having a sheet of rubber or the like, designated generally by the numeral 251, which of itself acts to resist the transfer of heat from the motor into the pump 151'. In any event, the coupling tends to prevent conduction of heat from the motor to the fluid regulating devices.

Fixedly attached to the casing of the pump 151', and spaced therefrom is a plate 255, which overlies the inlet opening to the pump casing 151'. As a result of this construction the air which is taken in by the pump 151' is drawn in around the periphery of this plate 255, through the space existing between this plate and the housing of the pump. And the inflow of heated air which might be thrown off from the motor 158' is prevented, the air being taken in around the periphery of this disk. Therefore, not only is the transfer of heat by conduction practically prevented because of the flexible coupling 250, but the inflow of heated air into the pump casing is also substantially prevented. And, of course, the location of the pump 150' completely prevents any objectionable transfer of heat from the motor to it. As a result greater accuracy can be secured with a device of this character than with the form described above.

Also, the outlet of the pump casing 151' is connected by means of a flexible tube, of any suitable character, to the casing 177', which is identical in construction with the corresponding part shown in Fig. 1, and contains an orifice and an adjustable valve for giving any predetermined effective orifice opening. Likewise the pump casing 150' is connected by means of a flexible tube 261 to the casing or cylindrical member 202' which is similar in construction to the corresponding member described above and illustrated more particularly in detail in Figs. 7 and 8. These flexible tubes simplify assembly, and furthermore prevent any vibration set up in the pumps from being transmitted to the calorimeter.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:—

1. In apparatus of the character described, a motor; a centrifugal fan having a rotor operably connected to said motor, and a casing having a fluid inlet opening thereinto, and a plate carried by the said casing and interposed between said centrifugal fan and the motor and overlying said fluid inlet opening, to prevent the heat generated by the said motor affecting the fluid passing into said inlet opening.

2. Apparatus for regulating the supply of fluid under pressure, comprising a member having a plurality of spaced longitudinal passages extending therethrough from end to end, a base plate for closing one end of said member, said base plate having passages therein connecting pairs of said spaced longitudinal passages, a cap plate for closing the other end of said member, said cap plate having passages therein connecting pairs of said spaced longitudinal passages in staggered relation with respect to the connected passages in said base plate, whereby a tortuous connected passage is provided, and an orifice plate positioned between said member and one of said plates, said orifice plate having a plurality of spaced orifices therein communicating with said tortuous passage at a plurality of spaced places in its length for staging down the pressure through said tortuous passage.

3. In apparatus of the character described, a fluid regulating device comprising a centrifugal fluid supplying means having an enclosing casing provided with an interior chamber which is circular in cross section, a rotary impeller mounted therein concentric with said casing, said impeller having radial blades, and said device having a fluid discharge orifice in communication with said casing by a radial outlet from said interior chamber, said orifice being relatively small in size as compared with the capacity of said centrifugal means whereby a pressure of the fluid supplied by said centrifugal means is built up behind said orifice due in substantial entirety to the centrifugal acceleration imparted to said fluid by the centrifugal means.

4. In apparatus of the character described, a fluid regulating device comprising a centrifugal fluid supplying means having an enclosing casing provided with an interior chamber which is circular in cross section, a rotary impeller mounted therein concentric with said casing and having its periphery spaced from the peripheral wall of said chamber to provide an annular channel about said impeller, said impeller having radial blades, and said device having a fluid discharge orifice in communication with said chamber through a radially arranged peripheral outlet for said casing, said orifice being relatively small in size as compared with the capacity of said centrifugal means, whereby a pressure of the fluid supplied by said centrifugal means is built up behind said orifice due in substantial entirety to the centrifugal acceleration imparted to said fluid by the centrifugal means.

5. In the supplying of fluids to maintain a predetermined relative proportioning of the several fluids while varying the total quantities of the fluids supplied, the method which comprises supplying each fluid to a respective orifice under controlled acceleration so that the flow of the fluid through its respective orifice results in substantial entirety from the head built up behind the orifice by acceleration imparted to the fluid, the flow through the orifice remaining substantially constant irrespective of specific gravity variations of the fluid due to inherent changes in the composition of the fluid, and coordinating the supply of each fluid to its respective orifice so that the several fluids are supplied under controlled proportional accelerations.

6. In apparatus of the character described, a motor, a driven shaft operated by said motor, and a plurality of centrifugal devices for supplying separate fluids operably connected to the said driven shaft, and a plurality of orifice members having orifices in communication with the respective centrifugal devices, each of said centrifugal devices supplying its respective fluid to one of said orifices at a pressure dependent in substantial entirety upon centrifugal acceleration, and the quantity of fluid flow through the said orifice remaining constant irrespective of inherent specific gravity variations of the fluid.

7. Apparatus of the character described, comprising a plurality of passages to which different fluids are supplied under pressure, a centrifugal means connected with each passage and supplying its respective fluid under a pressure due in substantial entirety to centrifugal acceleration, and means for operating the said centrifugal means for the various passages at a predetermined speed relationship.

8. In the supplying of fluids to maintain a predetermined relative proportioning of the several fluids while varying the total quantities of said fluids supplied, the method which comprises supplying each of said several fluids to a fluid discharge orifice of predetermined size, building up a pressure of each fluid behind its respective orifice due in substantial entirety to centrifugal acceleration imparted to each said fluid, and maintaining the centrifugal accelerations imparted to the several fluids in a constant proportion to insure constant proportional velocity of flow of the several fluids through their respective orifices irrespective of specific gravity variations in the fluids supplied due to inherent changes in the compositions of the said fluids.

9. In the supplying of a fluid of mixed composition to maintain a predetermined rate of supply irrespective of specific gravity variations of the fluid due to inherent changes in the composition of the said fluid, the method which comprises supplying said fluid to a fluid discharge orifice of predetermined size, building up a pressure of the fluid behind the said orifice due in substantial entirety to centrifugal acceleration imparted to the said fluid, and controlling the centrifugal acceleration to maintain the pressure of the fluid behind the orifice at a predetermined amount.

10. In the supplying of a fluid of mixed composition to maintain a predetermined rate of supply irrespective of specific gravity variations of the fluid due to inherent changes in the composition of said fluid, the method which comprises supplying the fluid to a plurality of successive fluid discharge orifices, building up a pressure of the fluid behind the said orifices due in substantial entirety to centrifugal acceleration imparted to the said fluid, controlling the centrifugal acceleration to maintain the pressure of the fluid behind the orifices at a predetermined amount, and staging down the drop in pressure as the fluid passes through the said successive orifices to give a predetermined rate of flow through the last orifice of the series.

11. Apparatus for regulating the supply of fluid, comprising a member having a fluid discharge orifice of predetermined size, centrifugal means for supplying the fluid under a pressure to said orifice due in substantial entirety to centrifugal acceleration imparted to the fluid by said centrifugal means, said centrifugal means being of large capacity compared with the effective opening of said orifice to build up a substantial pressure behind said orifice.

12. Apparatus for proportioning the supply of a plurality of fluids, comprising a plurality of orifice members having fluid discharge orifices of predetermined size, a centrifugal means connected with each orifice to supply a fluid to its respective orifice at a pressure which is due in substantial entirety to centrifugal acceleration imparted to the fluid by the said centrifugal means, and means for driving all said centrifugal means in coordinated speed relationship.

13. Apparatus for regulating the supply of atmospheric air, comprising a centrifugal fan for supplying atmospheric air under pressure, a motor for driving said fan, a direct shaft connection between said motor and fan, heat insulating means in said shaft connection, an atmospheric air inlet for said fan, and baffle means for said air inlet to restrain the inflow of heated atmospheric air from about said motor into said air inlet.

14. Apparatus for regulating and proportioning the supply of air and gaseous fuel, comprising spaced aligned centrifugal fans for supplying air and gaseous fuel respectively, a direct shaft connection between said centrifugal fans, an electric motor, a direct shaft connection between said electric motor and said air supplying centrifugal fan at the side thereof opposite said gaseous fuel supplying centrifugal fan, heat insulating means in said latter mentioned shaft connection, and an air inlet for said air supplying centrifugal fan adapted to restrain the inflow of heated air from about said motor into said air inlet.

15. In apparatus of the character described, a fluid feeding and regulating device, comprising an orifice member having a fluid discharge orifice of predetermined size, and means for delivering the fluid to said orifice under a head due in substantial entirety to centrifugal acceleration, including a centrifugal fan having a casing with interior chamber of circular cross-section, an impeller therein concentric with said chamber of the casing and having its periphery spaced from the peripheral wall of said chamber to provide an annular channel about said impeller free from baffles upon which the fluid can impact, and a radial outlet opening directly from said annular channel and connected with said orifice member behind said orifice.

HARRY F. SMITH.